United States Patent
Matsuoka

(10) Patent No.: US 8,559,165 B2
(45) Date of Patent: Oct. 15, 2013

(54) SOLID ELECTROLYTIC CAPACITOR

(75) Inventor: Keiko Matsuoka, Izumisano (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 130 days.

(21) Appl. No.: 13/235,896

(22) Filed: Sep. 19, 2011

(65) Prior Publication Data

US 2012/0075773 A1  Mar. 29, 2012

(30) Foreign Application Priority Data

Sep. 24, 2010  (JP) ................... 2010-214038

(51) Int. Cl.
  *H01G 9/02*  (2006.01)
(52) U.S. Cl.
  USPC ........... 361/525; 361/523; 361/528; 361/517; 361/519; 361/529
(58) Field of Classification Search
  USPC .................. 361/523, 525, 528, 529, 516–519
  See application file for complete search history.

(56) References Cited

U.S. PATENT DOCUMENTS 5,005,107 A * 4/1991 Kobashi et al. ............... 361/540
8,083,920 B2 * 12/2011 Yoshimitsu ................... 205/198

FOREIGN PATENT DOCUMENTS

JP  2009-10238 A  1/2009

* cited by examiner

*Primary Examiner* — Nguyen T Ha
(74) *Attorney, Agent, or Firm* — Westerman, Hattori, Daniels & Adrian, LLP

(57) ABSTRACT

A solid electrolytic capacitor includes an anode element, a dielectric layer, a solid electrolytic layer, and a cathode layer. The dielectric layer is formed on the anode element. The solid electrolytic layer is formed on the dielectric layer. The cathode layer is formed so as to contact the solid electrolytic layer. The cathode layer is a silver paste layer having an imide-based polymer as a binder resin. A solid electrolytic capacitor that can be improved in characteristics can thus be obtained.

3 Claims, 2 Drawing Sheets

SOLID ELECTROLYTIC CAPACITOR

This nonprovisional application is based on Japanese Patent Application No. 2010-214038 filed on Sep. 24, 2010 with the Japan Patent Office, the entire contents of which are hereby incorporated by reference.

BACKGROUND OF THE INVENTION

1. Field of the Invention

The present invention relates to a solid electrolytic capacitor.

2. Description of the Related Art

As a conventional solid electrolytic capacitor, Japanese Patent Laying-Open No. 2009-10238 is mentioned, for example. FIG. 2 is a schematic sectional view showing a structure of the solid electrolytic capacitor disclosed in Japanese Patent Laying-Open No. 2009-10238. With reference to FIG. 2, the solid electrolytic capacitor of Japanese Patent Laying-Open No. 2009-10238 includes an anode element 1, a dielectric layer 2 formed at the surface of anode element 1, a conductive polymer layer 3 formed on dielectric layer 2, and a cathode layer 4 formed on conductive polymer layer 3. Cathode layer 4 has a carbon layer 4a made of a layer formed on conductive polymer layer 3 and containing carbon particles, and a silver paste layer 4b made of a layer formed on carbon layer 4a and containing silver particles.

The solid electrolytic capacitor disclosed in Japanese Patent Laying-Open No. 2009-10238 has carbon layer 4a. When forming carbon layer 4a, it is difficult to control the thickness of the carbon layer. If carbon layer 4a is formed thick, cracks will be likely to occur at the time of exterior covering. This raises a problem in that the solid electrolytic capacitor deteriorates in characteristics.

Another possible technique is to form silver paste layer 4b so as to contact conductive polymer layer 3 without forming carbon layer 4a. In this case, however, a gap is left between conductive polymer layer 3 and silver paste layer 4b. This raises a problem in that the solid electrolytic capacitor deteriorates in characteristics.

SUMMARY OF THE INVENTION

The present invention was made to solve the above-described problems, and has an object to provide a solid electrolytic capacitor that can be improved in characteristics.

To solve the above-described object, the inventor of the present invention intensely studied means for reducing the gap left between the conductive polymer layer and the silver paste layer in the case of forming the silver paste layer without forming the carbon layer. As a result, the inventor found out that the solid electrolytic capacitor can be improved in characteristics without forming the carbon layer, by using an imide-based polymer as a binder resin of the silver paste layer.

Specifically, a solid electrolytic capacitor of the present invention includes an anode element, a dielectric layer, a solid electrolytic layer, and a cathode layer. The cathode layer is a silver paste layer having an imide-based polymer as a binder resin. The dielectric layer is formed on the anode element. The solid electrolytic layer is formed on the dielectric layer. The cathode layer is formed so as to contact the solid electrolytic layer.

According to the solid electrolytic capacitor of the present invention, the cathode layer is a silver paste layer having an imide-based polymer as a binder resin. Since the imide-based polymer comes into close contact with the solid electrolytic layer, the gap between the silver paste layer and the solid electrolytic layer can be reduced without forming a carbon layer. This can suppress deterioration in characteristics that would result from the gap between the cathode layer and the solid electrolytic layer. Further, since a carbon layer can be omitted, deterioration in characteristics that would result from formation of a carbon layer can be prevented. A solid electrolytic capacitor that can be improved in characteristics can thus be achieved.

In the above-described solid electrolytic capacitor, preferably, the solid electrolytic layer contains polypyrrole.

Since the surface of the solid electrolytic layer containing polypyrrole is smooth, a gap is likely to be left if a silver paste layer is formed directly thereon. However, by using an imide-based polymer as a binder resin of the silver paste layer, the silver paste layer in contact with the solid electrolytic layer containing polypyrrole can be formed with a reduced gap. A solid electrolytic capacitor that can be improved in characteristics can thus be achieved, even when the solid electrolytic layer contains polypyrrole.

As described above, according to the solid electrolytic capacitor of the present invention, characteristics can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
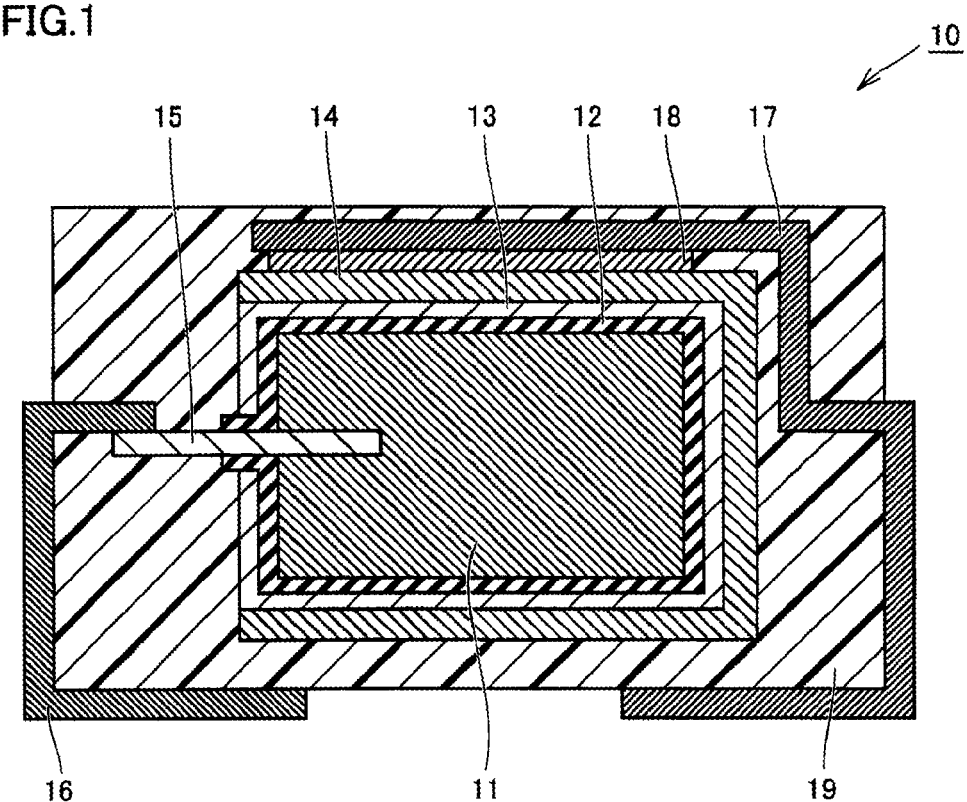
FIG. 1 is a sectional view schematically showing a structure of a solid electrolytic capacitor according to an embodiment of the present invention.
Figure 2:
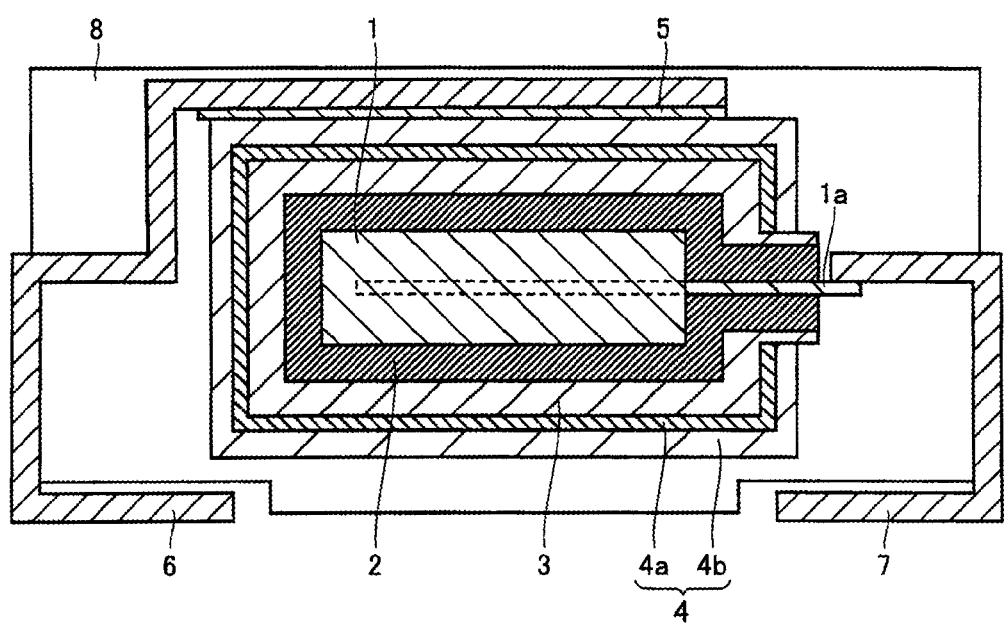
FIG. 2 is a sectional view schematically showing a structure of a solid electrolytic capacitor of Japanese Patent Laying-Open No. 2009-10238.

Hereinafter, an embodiment of the present invention will be described based on the drawings. It is noted that like reference numeral denotes like or corresponding part in the drawings, description of which is not repeated.

FIG. 1 is a sectional view schematically showing a structure of a solid electrolytic capacitor 10 according to an embodiment of the present invention. With reference to FIG. 1, solid electrolytic capacitor 10 according to the embodiment of the present invention will be described first.

As shown in FIG. 1, solid electrolytic capacitor 10 includes an anode element 11, a dielectric layer 12, a solid electrolytic layer 13, and a cathode layer 14. Anode element 11, dielectric layer 12, solid electrolytic layer 13, and cathode layer 14 constitute a capacitor element of solid electrolytic capacitor 10. Dielectric layer 12 is formed on anode element 11, and in the present embodiment, formed so as to contact anode element 11. Solid electrolytic layer 13 is formed on dielectric layer 12, and in the present embodiment, formed so as to contact dielectric layer 12. Cathode layer 14 is formed so as to contact solid electrolytic layer 13.

Anode element 11 is made of a sintered compact of a valve metal, for example. The valve metal includes, for example, tantalum (Ta), niobium (Nb), titanium (Ti), aluminium (Al), and the like. The sintered compact has a porous structure.

Dielectric layer 12 is an oxide film formed by subjecting the valve metal to chemical conversion. For example, the composition of dielectric layer 12 obtained by implementing the valve metal by tantalum is tantalum oxide ($Ta_2O_5$), and the composition of dielectric layer 12 obtained by implementing the valve metal by aluminium is aluminium oxide ($Al_2O_3$).

Solid electrolytic layer 13 is composed of a conductive polymer material, such as polypyrrole, polyfuran or polyaniline, TCNQ complex salt (7,7,8,8-tetracyanoquinodimethane), and the like. Solid electrolytic layer 13 preferably contains polypyrrole, and more preferably, is made of polypyrrole. Solid electrolytic layer 13 is preferably composed of polypyrrole produced by electrolytic polymerization. The surface of polypyrrole produced by electrolytic polymerization is particularly smooth.

Cathode layer 14 is a silver paste layer having an imide-based polymer as a binder resin. In other words, cathode layer 14 contains the imide-based polymer as a binder resin and silver particles. Cathode layer 14 does not include a carbon layer.

The imide-based polymer composing the silver paste layer includes, for example, aromatic polyimide shown in Chemical Formula 1 below. It is noted that R and R' in Chemical Formula 1 below represent aromatic groups.

[Chemical Formula 1]

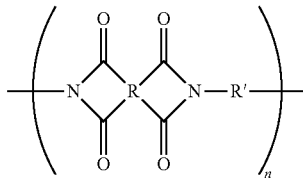

Solid electrolytic capacitor 10 of the present embodiment further includes an anode lead 15, an anode terminal 16, a cathode terminal 17, and an adhesion layer 18.

Anode lead 15 is a rod-like member made of metal such as tantalum, for example, with its one end embedded in anode element 11 and the other end arranged to protrude from the capacitor element to the outside. Anode terminal 16 is partly connected to anode lead 15 by welding or the like. Cathode terminal 17 is arranged to be connected to cathode layer 14, which is the outermost layer of the capacitor element, with adhesion layer 18 made of a conductive adhesive interposed therebetween. Anode terminal 16 and cathode terminal 17 are made of metal, such as copper or copper alloy, for example.

Solid electrolytic capacitor 10 of the present embodiment further includes an exterior resin 19. Exterior resin 19 seals the capacitor element with anode lead 15, anode terminal 16, cathode terminal 17, and adhesion layer 18 arranged such that portions of anode terminal 16 and cathode terminal 17 are exposed. Exterior resin 19 can be implemented by epoxy resin, for example.

With reference to FIG. 1, a method of fabricating solid electrolytic capacitor 10 according to the present embodiment will now be described.

First, anode element 11 is prepared. In this step, raw material powder, which is powder of a valve metal, for example, is prepared, and is molded into a desired shape with one end of anode lead 15 in the longitudinal direction embedded in the raw material powder. Then, the molded raw material powder is sintered, so that anode element 11 with one end of anode lead 15 embedded therein can be formed. Anode lead 15 and anode element 11 are preferably made of an identical valve metal.

Then, dielectric layer 12 is formed on anode element 11. In this step, for example, anode element 11 is immersed in an acid solution, such as nitric acid or phosphoric acid, to be subjected to electrolytic chemical conversion, so that dielectric layer 12 is formed at a surface portion of anode element 11.

Then, solid electrolytic layer 13 is formed on dielectric layer 12. In this step, solid electrolytic layer 13 made of a conductive polymer is formed on dielectric layer 12 by electrolytic polymerization, chemical polymerization, or the like. Solid electrolytic layer 13 is preferably formed by electrolytic polymerization.

When forming solid electrolytic layer 13 by electrolytic polymerization, a method of immersing anode element 11 with dielectric layer 12 formed thereon in an electrolytic polymerization liquid containing a monomer and a dopant, for example, thereby causing electrolytic oxidation with anode element 11 serving as an anode can be adopted.

When forming solid electrolytic layer 13 by chemical polymerization, a method of immersing anode element 11 with dielectric layer 12 formed thereon in a chemical polymerization liquid containing a monomer, an oxidant and a dopant, a method of applying the above-described chemical polymerization liquid onto anode element 11 with dielectric layer 12 formed thereon, a method of immersing anode element 11 with dielectric layer 12 formed thereon in each of a monomer solution and an oxidant solution, and a method of applying each of a monomer solution and an oxidant solution onto anode element 11 with dielectric layer 12 formed thereon, or the like can be adopted.

It is noted that, in the above-described chemical polymerization, it is not always necessary to implement the oxidant and the dopant by different materials, but a material that serves both as the oxidant and the dopant can be used. Moreover, besides the above-described material, an additive such as a surface active agent may be added to the above-described chemical polymerization liquid or the electrolytic polymerization liquid. Further, thermochemical polymerization of applying heat after the above-described chemical polymerization may be performed.

Then, a silver paste layer having an imide-based polymer as a binder resin is formed on solid electrolytic layer 13 as cathode layer 14. In this step, for example, a silver paste layer having an imide-based polymer as a binder resin is applied onto solid electrolytic layer 13, and then drying, thereby forming cathode layer 14. The step of applying the silver paste layer is not particularly limited, but dipping, screen printing or the like can be adopted. In this step of forming cathode layer 14, the step of forming a carbon layer is omitted. A capacitor element can thus be fabricated.

Then, each of anode terminal 16 and cathode terminal 17 is connected to anode element 11 and cathode layer 14. In this step, anode terminal 16 made of copper or copper alloy, for example, is connected to anode lead 15, and cathode terminal 17 made of copper or copper alloy is connected to cathode layer 14. Cathode layer 14 and cathode terminal 17 are connected to each other by means of adhesion layer 18, for example. Anode terminal 16 and anode lead 15 can be connected by resistance welding, for example. It is noted that cathode layer 14 and cathode terminal 17 may be connected to each other by resistance welding, and anode terminal 16 and anode lead 15 may be connected by means of adhesion layer 18.

Covering with exterior resin 19 follows. In this step, exterior resin 19 covers the capacitor element such that portions of anode terminal 16 and cathode terminal 17 are exposed to the outside. The method of covering is not particularly limited, but transfer molding or the like can be adopted, for example.

Then, the exposed portions of anode terminal 16 and cathode terminal 17 at exterior resin 19 are bent along exterior resin 19.

By carrying out the steps described above, solid electrolytic capacitor 10 shown in FIG. 1 can be fabricated.

As described above, according to solid electrolytic capacitor 10 and the method of fabricating the same of the present embodiment, cathode layer 14 is a silver paste layer having an imide-based polymer as a binder resin. Since an imide-based polymer comes into close contact with solid electrolytic layer 13, a gap between cathode layer 14 and solid electrolytic layer 13 can be reduced without forming a carbon layer. This can suppress deterioration in characteristics that would result from the gap between cathode layer 14 and solid electrolytic layer 13. Further, a carbon layer whose thickness is difficult to control and whose strength is low can be omitted, which thus can prevent deterioration in characteristics that would result from formation of a carbon layer. Therefore, characteristics, such as reliability, equivalent series inductance (ESL) capacitance (Cap), leakage current (LC), can be improved.

Further, since the step of forming a carbon layer can be omitted, manufacturing costs can also be reduced.

In solid electrolytic capacitor 10 and the method of fabricating the same of the present embodiment, solid electrolytic layer 13 preferably contains polypyrrole. The surface of solid electrolytic layer 13 containing polypyrrole is smooth. However, by using an imide-based polymer as a binder resin of the silver paste layer, the silver paste layer that contacts solid electrolytic layer 13 containing polypyrrole can be formed with a reduced gap according to an anchor effect. Solid electrolytic capacitor 10 that can be improved in characteristics can thus be achieved even in the case where solid electrolytic layer 13 contains polypyrrole.

EXAMPLE

In the present example, the effect exerted in the case where the cathode layer was a silver paste layer having an imide-based polymer as a binder resin was studied.

Example 1 of the Present Invention

In Example 1 of the present invention, solid electrolytic capacitor 10 shown in FIG. 1 was fabricated basically in accordance with the method of fabricating a solid electrolytic capacitor of the above-described embodiment.

Specifically, first, tantalum powder was prepared, and was molded into rectangular solid with one end of anode lead 15, which was a rod-like member, in the longitudinal direction embedded in the tantalum powder. Then, this was sintered to prepare anode element 11 with one end of anode lead 15 embedded therein.

Then, anode element 11 was immersed in a phosphoric acid solution, and a voltage was applied, thereby forming dielectric layer 12 made of $Ta_2O_5$ at the surface of anode element 11.

Then, anode element 11 with dielectric layer 12 formed thereon was immersed in an electrolytic polymerization liquid containing polypyrrole to form solid electrolytic layer 13. Drying followed to form solid electrolytic layer 13 on dielectric layer 12.

Then, cathode layer 14 was formed on solid electrolytic layer 13 using a silver paste having silver powder whose mean particle diameter ranged from 0.2 to 1.0 μm, NMP (N-methyl-2-pyrrolidone) as a solvent, and an imide-based polymer as a binder resin.

Then, anode terminal 16 was connected to anode lead 15 by spot welding, and cathode terminal 17 was connected to cathode layer 14 with conductive adhesion layer 18 interposed therebetween. Then, the whole was molded to be covered with exterior resin 19. Through the steps described above, solid electrolytic capacitor 10 of Example 1 of the present invention was fabricated, as shown in FIG. 1.

Comparative Example 1

Comparative Example 1 was fabricated basically similarly to solid electrolytic capacitor 10 of Example 1 of the present invention, but differed in that a cathode layer with a carbon layer and a silver paste layer stacked was formed. Specifically, after forming solid electrolytic layer 13, the carbon layer was formed on solid electrolytic layer 13. Then, the silver paste layer having an imide-based resin as a binder resin similar to that of Example 1 of the present invention was formed on the carbon layer.

Comparative Example 2

Comparative Example 2 was fabricated basically similarly to the solid electrolytic capacitor of Comparative Example 1, but differed in that a silver paste layer having an epoxy-based resin as a binder resin was formed as a cathode layer. That is, the solid electrolytic capacitor of Comparative Example 2 included a carbon layer formed on the solid electrolytic layer and a silver paste layer formed on the carbon layer, and the binder resin of the silver paste layer was an epoxy-based polymer.

Comparative Example 3

Comparative Example 3 was fabricated basically similarly to solid electrolytic capacitor 10 of Example 1 of the present invention, but differed in that a silver paste layer having an epoxy-based resin as a binder resin was formed as a cathode layer. That is, the solid electrolytic capacitor of Comparative Example 3 did not include a carbon layer, and the binder resin of the silver paste layer was an epoxy-based polymer.

(Evaluation Method)

The solid electrolytic capacitors of Example 1 of the present invention and Comparative Examples 1 to 3 were measured in ESR using an LCR meter. The condition for measuring ESR was 100 kHz. The results are shown in Table 1 below.

TABLE 1

| | Presence/absence of carbon layer | Binder resin | ESR (mΩ) | | |
|---|---|---|---|---|---|
| | | | Average | Maximum | Minimum |
| Example 1 of the present invention | absent | imide-based polymer | 11 | 12 | 10 |
| Comparative Example 1 | present | imide-based polymer | 14 | 18 | 11 |
| Comparative Example 2 | present | epoxy-based polymer | 14 | 17 | 11 |
| Comparative Example 3 | absent | epoxy-based polymer | 16714 | 21550 | 10840 |

(Evaluation Result)

As shown in Table 1, Example 1 of the present invention which did not include a carbon layer and in which the binder resin of the silver paste layer was an imide-based polymer presented improved ESR as compared to Comparative Examples 1 and 2 including a carbon layer. Example 1 of the present invention presented significantly improved ESR as compared to Comparative Example 3 which did not include a carbon layer and in which the binder resin was an epoxy resin. These results have revealed that ESR can be improved by omitting a carbon layer, and ESR can be improved further by using an imide-based resin as a binder resin.

From the foregoing, according to the present Example, it has been confirmed that characteristics can be improved without forming a carbon layer, since the cathode layer is a silver paste layer having an imide-based polymer as a binder resin.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor comprising:
   an anode element;
   a dielectric layer formed on said anode element;
   a solid electrolytic layer formed on said dielectric layer; and
   a cathode layer formed so as to contact said solid electrolytic layer,
   said cathode layer being a silver paste layer having an imide-based polymer as a binder resin,
   wherein said imide-based polymer contains aromatic polyimide having a structure shown in Chemical Formula 1:

[Chemical Formula 1]

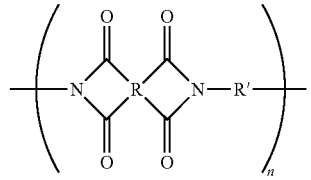

where R and R' in Chemical Formula 1 represent aromatic groups.

2. The solid electrolytic capacitor according to claim 1, wherein said solid electrolytic layer contains polypyrrole.

3. The solid electrolytic capacitor according to claim 2, wherein said solid electrolytic layer is composed of said polypyrrole produced by electrolytic polymerization.

* * * * *